United States Patent [19]

Kobayashi et al.

[11] Patent Number: 4,952,800
[45] Date of Patent: Aug. 28, 1990

[54] PHOTOELECTRIC SWITCH WITH HEATING RESPONSIVE TO TEMPERATURE AND LIGHT

[75] Inventors: Atsuhito Kobayashi, Okaya; Shoichi Ono; Takayuki Shiraishi, both of Suwa; Kohei Hosayama, Nagano, all of Japan

[73] Assignee: Chinon Kabushiki, Suwa, Japan

[21] Appl. No.: 395,046

[22] Filed: Aug. 17, 1989

[51] Int. Cl.$^5$ ................................................ H01J 7/24
[52] U.S. Cl. ...................................... 250/238; 250/239
[58] Field of Search ....................... 250/238, 239, 352; 219/201

[56] References Cited

U.S. PATENT DOCUMENTS 4,667,105  5/1987  Miyatake et al. .................... 250/352
4,695,714  9/1987  Kimizuka et al. .................... 250/238
4,880,979  11/1989  Yoshida ............................... 250/352

Primary Examiner—David C. Nelms
Assistant Examiner—Que Tan Le
Attorney, Agent, or Firm—Morrison Law Firm

[57] ABSTRACT

The photoelectric switch includes a heating unit formed on a light transmitting plate around a beam transmission part of the body of a light receiving part. A received light quantity decision circuit compares an electrical signal corresponding to a quantity of light received with a set level to decide whether or not it is below the set level. A temperature circuit generates an electrical signal corresponding to an ambient temperature in the vicinity of the body. A driving circuit for energizing the heating unit requires that the temperature circuit below a set temperature and that the quantity of received light is also below the set level. If either condition fails, the heating unit remains deenergized.

11 Claims, 3 Drawing Sheets

PHOTOELECTRIC SWITCH WITH HEATING RESPONSIVE TO TEMPERATURE AND LIGHT

BACKGROUND OF THE INVENTION

1. Field of the Invention

This invention relates to a photoelectric switch with a dewing preventative applied to a front light transmitting plate provided on a body.

2. Description of the Prior Art

A photoelectric switch is utilized as a vision sensor in the FA and other fields, for detecting the presence and position of an object. The photoelectric switch is a superior sensor due to its long detection distance and other characteristics as compared with other contactless switch devices (electromagnetic induction type/electrostatic capacity type contactless switch). However, there is an environmental problem which photoelectric switches must overcome. In particular, it is necessary to solve the problem of erroneous operation due to degraded light transmission from water splashed on the equipment or dew or frost forming thereon.

One type of photoelectric switch solves this problem by providing a photoelectric switch with a heating hood 12 for preventing the formation of dew on a body 11 as shown in FIG. 5 and FIG. 6. FIG. 5 exemplifies a reflection type photoelectric switch, wherein a light emitting part and a light receiving part are incorporated within the body 11. That is, a light such as an infrared ray is projected toward a reflecting plate 13 from the light emitting part in the body 11. A reflected light from the reflecting plate 13 is received in the light receiving part in the body 11. When the projected or reflected light is intercepted by an object 14 to be detected, the interception changes the quantity of received light at the light receiving part. Thus the presence of the object 14 at a predetermined position is detected.

The heating hood 12 has a contour part 15 fitting an outer periphery of the front of the body 11. A light transmitting plate 16 within the contour part 15 covers the front of the body 11. A heating unit 17 (FIG. 6), using carbon resistance, heating wire or the like, is disposed about a peripheral edge portion of the back of the light transmitting plate 16. The heating unit 17 is heated by connection of an electric current thereto from a power source 18 through wires 19. The heat prevents dew from forming on the light transmitting plate 16.

In the above construction, the heating hood 12 is mounted on the front of the body 11 when the photoelectric switch is used in an environment where dew, frost or splashed water or the like light transmission into and out of the body 11. The electric current is connected to the heating unit 17 independently of operation of the body 11, or light projection and reception, and thus asynchronously therewith. For example, connection of electricity to the heating unit 17 may be manually controlled by a user on decision. Alternatively heating may be carried out at all times. A thermostat (not shown) may be mounted within the heating hood 12 for starting and stopping operation of the heating unit whenever temperature passes a preset value.

The light transmitting plate 16 is heated by conduction from the its rear surface on which the heating unit 17 is mounted. Thus, formation of dew or frost on the front of the light transmitting plate 16 is prevented. Splashed water is evaporated from the light transmitting plate 16. by the heat.

As shown in FIG. 6, the heating unit 17 abuts a peripheral edge portion of the back of the light transmitting plate 16. Therefore heat transfer efficiency to the light transmitting plate 16 is poor, especially near its center. Thus the time for removing dew, frost or water from the transmitting portion is unavoidably long. Although the entire light transmitting plate 16 is heated the only portion actually requiring heating is that portion through which the light passes from and to the photoelectric switch. Thus the entire light transmitting plate 16 need not be heated. Accordingly, the efficiency of using heat is low.

The heating hood 12 is a so-called externally fitting type for mounting on the front of the body 11 as occasion demands. The heating unit 17 is operated asynchronously with the body 11 of the photoelectric switch. It is therefore hard to coordinate heating with changes in the environment. That is, as mentioned hereinbefore, energization of the heating unit 17 is controlled manually at the user's decision, or carried out at all times, or is controlled according temperature information on a thermostat. In any case, the problem remains of efficiently responding to changes in the environment wherein a quantity of received light decreases due to dews frost or water and is restored to its original value on removal of the dew, frost or water.

SUMMARY OF THE INVENTION

It is object of the invention to provide a photoelectric switch that is highly effective for preventing dew and frost formation and provides superior responsiveness to changes in the environment.

The photoelectric switch according to this invention has a heating unit formed on a light transmitting plate surrounding a beam transmission part on the body of a light receiving part. A received light quantity decision circuit generates an electrical signal corresponding to a quantity of light received on the light receiving part. The electrical signal is compared with a set level to decide whether or not it is below the set level. A temperature circuit generates an electrical signal corresponding to an ambient temperature in the vicinity of the body. A driving circuit energizes the heating unit on condition that both the temperature has fallen below a set temperature and the quantity of received light has fallen below a set level.

Only the beam transmission part of the light transmitting plate is heated by the heating unit around the beam transmission part. Therefore efficient and rapid heating is capable of removing dew almost instantaneously. Energization of the heating unit is conditioned on both the ambient temperature the quantity of light received by the light receiving part falling below set thresholds. Therefore, when the temperature is low, as soon as the quantity of received light decreases due to dew formation the heating unit is energized immediately to remove the dew. Energization of the heating unit is cut off upon recovery of the quantity of received light. That is, energization and deenergization of the heating unit is controlled in swift response to changes in the environment. Therefore incorrect operation due to dewing and the like is prevented.

According to an embodiment of the invention, there is provided a photoelectric switch, comprising: a light receiving part, a light transmitting plate on the light receiving part, a beam transmission part in the light transmitting plate, a heating unit on the light transmitting plate surrounding the beam transmission part, means for producing a first signal when an environmental temperature falls below a first set value, means for producing a second signal when a quantity of light received through the beam transmission part falls below a second set value, and means responsive to the simultaneous presence of the first signal and the second signal for energizing the heating unit.

According to a feature of the invention, there is provided a heating unit for a beam transmitting part of a light transmitting plate comprising: a resistive material coated on the light transmitting plate surounding the beam transmitting part, a conductive surrounding current passage in electrical contact with the resistive material and surrounding a substantial part of the beam transmitting part, at least one gap in the surrounding current passage, and means for feeding electrical power to the surrounding current passage, whereby the electrical power crosses the at least one gap through the resistive material and heat is generated therein.

According to a further feature of the invention, there is provided a control circuit for controlling energization of a heater for heating a vicinity of a beam transmission part, comprising: means for producing a first signal in response to an environmental temperature falling below a first set value, means for producing a second signal in response to a light beam passing through the beam transmission part falling below a second set value, and driver responsive to the simultaneous occurrence of the first and second signal for energizing the heater.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT

The invention will now be described with reference to the accompanying drawings representing one embodiment thereof.

Figure 1:
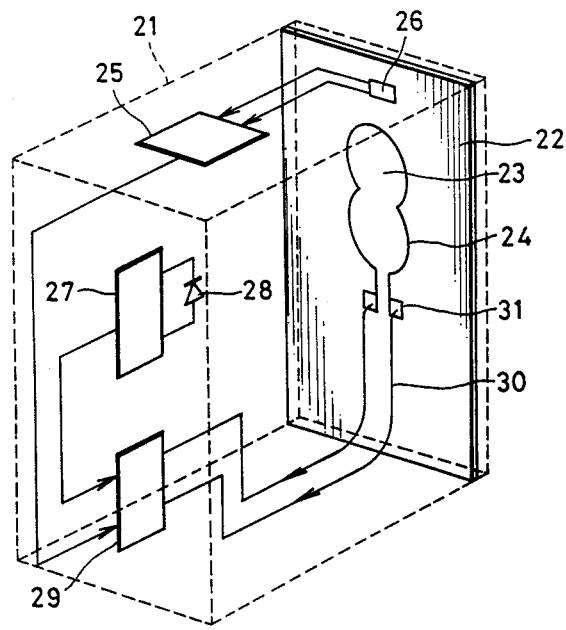
FIG. 1 is a perspective view of a photoelectric switch according to one embodiment of the invention.

In FIG. 1, a reference numeral 21 denotes a body of a reflection type photoelectric switch, within which a light emitting part and a light receiving part are provided, while not so indicated. A light transmitting plate 22, of glass or other transparent material, covers the front of the body 21. The front is defined as a face defining the fields of view of lenses of the light emitting part and the light receiving. The light transmitting plate 22 has a beam transmission part 23 through which a beam of light projected from the light emitting part and a beam of reflected light incident on the light receiving part from an external reflecting plate pass. A heating unit 24 is provided around the beam transmission part 23.

A reference numeral 25 denotes a temperature circuit, which receives a signal from a heat sensor 26, such as a thermistor or the like, mounted on the back of the light transmitting plate 22 near the heating unit 24. Heat sensor 26 generates an electrical signal responsive to a temperature in the vicinity of the body 21.

A reference numeral 27 denotes a received light quantity decision circuit on the light receiving part. The decision circuit 27 generates an electrical signal corresponding a light reception signal generated as a result of light received by a light receiving element 28. The decision circuit 27 decides whether or not the level of the electrical signal is higher or lower than a preset level.

A reference numeral 29 denotes a driving circuit, which energizes the heating unit 24 through lead wires 30 and electrodes 31 when the electrical signal from the temperature circuit 25 is below that which would be present at a set temperature. This infers that the quantity of received light is below a set level.

Figure 2:
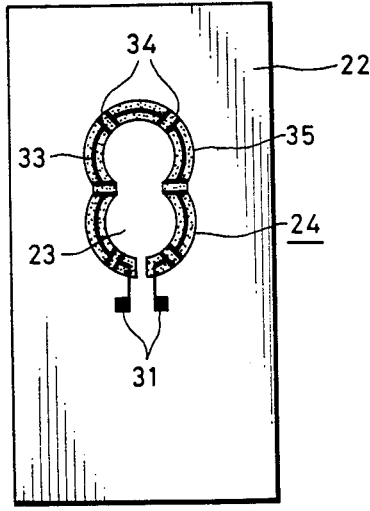
FIG. 2 is a front view showing the light transmitting plate of FIG. 1.

The heating unit 24 is formed as shown in FIG. 2. A surrounding current passage 33 of conductive material such as silver or the like is formed on the light transmitting plate 22 surrounding the beam transmission part 23. Opposed ends of the surrounding current passage are connected to the electrodes 31. A plurality of gaps 34 are formed in the surrounding current passage 33. Further, a carbon material 35 is printed on the surrounding current passage 33 and over the gaps 34. The carbon material 35 is not printed on the electrodes 31. When an electric current is conducted between the electrodes 31, heat is generated in the carbon material at each gap 34.

Figure 3:
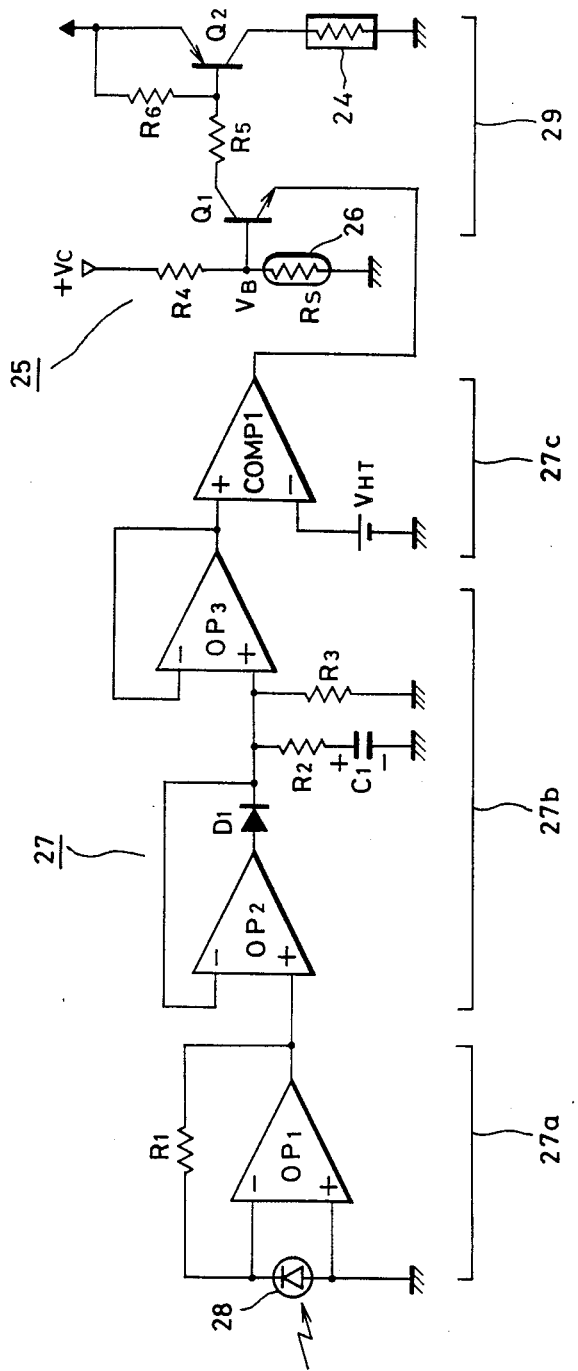
FIG. 3 is a schematic diagram showing a concrete configuration of each circuit in FIG. 1.
Figure 5:
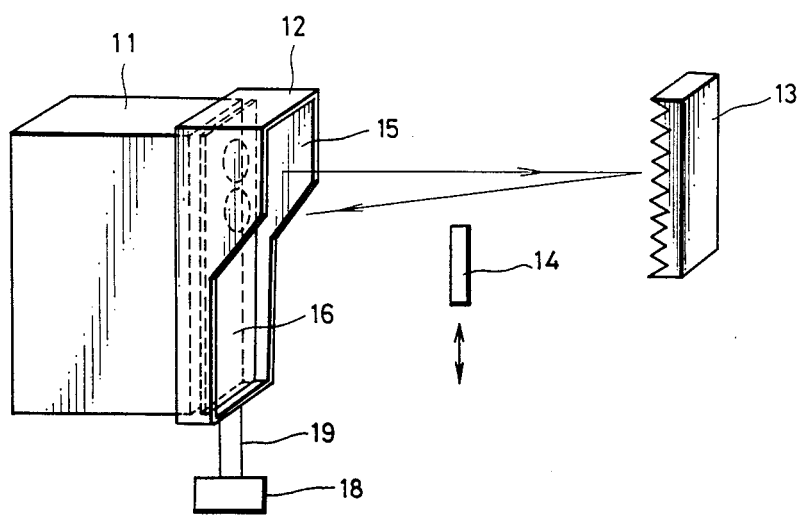
FIG. 5 and FIG. 6 are perspective views of a prior art system.
Figure 6:
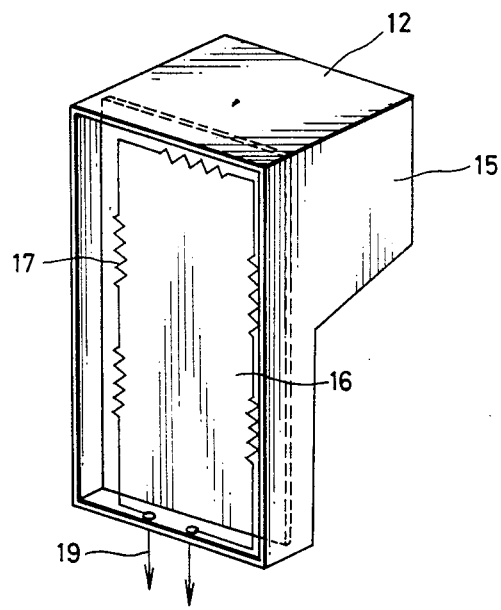

FIG. 3 represents a concrete circuit configuration of the temperature circuit 25, the received light quantity decision circuit 27, and the driving circuit 29 shown in FIG. 1. First, the received light quantity decision circuit 27 will be taken up for description. The received light quantity decision circuit 27 comprises a photoelectric conversion part 27a, a peak holding part 27b, and a comparison part 27c. The photoelectric conversion part 27a has an operational amplifier $OP_1$. The light receiving element (photodiode, for example) 28 is connected between the plus (+) and the minus (−) inputs in the indicated polarity. A feedback resistance $R_1$ is provided between the output and the minus (−) input of the operational amplifier $OP_1$. An electrical signal corresponding to a quantity of light received on the light receiving element 28 is produced at the output of the operational amplifier $OP_1$.

The peak holding part 27b receives the output of the photoelectric conversion part 27a, and holds a peak value of the input on a sufficiently large time constant so as to prevent the output from decreasing sharply against an instantaneous decrease in the quantity of light due to detection of an object and other short-term causes. The peak holding part 27b has two operational amplifiers $OP_2$, $OP_3$, and a capacitor $C_1$ and two resistances $R_2$, $R_3$ for setting the time constant. The output of the operational amplifier $OP_1$ is connected to the plus (+) input of the operational amplifier $OP_2$. An output of the operational amplifier $OP_2$ is connected to the plus (+) input of the operational amplifier $OP_3$ through a reverse blocking diode $D_1$. The output of the operational amplifier $OP_2$ is also connected back to its minus (−) input. A series circuit of the resistance $R_2$ and the capacitor $C_1$ in parallel with the resistance $R_3$ are connected from the cathode of the diode $D_1$ to ground. The output of the operational amplifier $OP_3$ is connected back to its minus (−) input.

The comparison part 27c has a comparator $Comp_1$ which compares the output of the peak holding part 27b, which is applied to its plus (+) input, with a reference voltage $V_{HT}$ set beforehand. If the output level of the peak holding part 27b exceeds the reference voltage $V_{HT}$, the comparator $Comp_1$ generates an "H" level output. If the output level of the peak holding circuit 27b is lower than the reference voltage $V_{HT}$, the comparator $Comp_1$ generates an "L" level output.

The temperature circuit 25 includes connecting a resistance $R_4$ and a thermistor $R_S$, used as the heat sensor 26, in series between a power source $+V_C$ and ground. The voltage divider formed by connecting resistor $R_4$ and thermistor $R_S$ produces an electrical signal (voltage $V_B$) corresponding to ambient temperature at their junction.

The driving circuit 29 has npn transistor $Q_1$ receiving the voltage $V_B$ at its base. An emitter of the transistor $Q_1$ is connected to the output of the comparator $Comp_1$. A collector of transistor $Q_1$ is connected through a resistance $R_5$ to a base of pnp transistor $Q_2$. The heating unit 24 is connected between the collector of the transistor $Q_2$ and ground. The emitter of the transistor $Q_2$ is connected to a power source (not indicated) for the heating unit 24. In addition the emitter of the transistor $Q_2$ is connected through a resistance $R_6$ to its base.

A pulsating light projected from the light emitting part (not shown) is received by the light receiving element 28 of the light receiving part. A current corresponding to the quantity of received light flows in the light receiving element 28 and is converted into a voltage by the operational amplifier $OP_1$. The voltage signal corresponding to the quantity of received light after conversion has its peak value held by the peak holding part 27b on a predetermined time constant. The peak value thus held is compared with the reference voltage $V_{HT}$ by the comparator $Comp_1$.

The quantity of received light is sufficient under normal measuring conditions. Therefore the output level of the peak holding part 27b is normally higher than the reference voltage $V_{HT}$ of the comparator $Comp_1$. As a consequence, the comparator $Comp_1$ generates the "H" level output. However, if the quantity of received light decreases due to dewing, frost, water or the like, the output of the peak holding part 27b also decreases gradually. When the output of the peak holding circuit 27 decreases to a value below reference voltage $V_{HT}$, the output of the comparator $Comp_1$ changes to the "L" level.

When the ambient temperature drops, the resistance value of the thermistor $R_S$, or heat sensor 26, in the temperature circuit 25 increases, thus increasing the voltage $V_B$. When the voltage $V_B$ reaches about 0.6 V due to the ambient temperature having dropped to a value at which dew formation may occur, the transistor $Q_1$ can be turned on. The transistor $Q_1$ remains off, however until the output of the comparator $Comp_1$ changes to the "L" level due to a decrease in the quantity of received light. That is, dew is detected when the quantity of received light falls below a threshold and the ambient temperature falls below a predetermined temperature. Under these two conditions, the transistor $Q_1$ remains on. The transistor $Q_2$ is turned on when the transistor $Q_1$ is on. Thus an electric current is applied to heat the heating unit 24.

The beam transmission part 23 surrounded by the heating unit 24 is heated by the heating unit 24, and dew thereon is removed. The beam transmission part 23 is heated efficiently by the heating unit 24 because the heating unit 24 surrounds the beam transmission part 23. This permits the temperature of the beam transmission part 23 to be raised almost instantaneously using a small amount of electric power. Consequently dew or frost can be removed with almost no delay. Dew has been removed experimentally using about 100 mW of electricity at an environmental temperature of −20° C.

When the quantity of received light increases by a removal of the dew or frost the output of the comparator $Comp_1$ changes to the "H" level. This turns off the transistors $Q_1$ and $Q_2$, and energization of the heating unit 24 is cut off.

When the output of the comparator $Comp_1$ becomes "L" level due to a decrease in the quantity of received light, and the ambient temperature remains above a level to raise the voltage $V_B$ above 0.6 V, the transistors $Q_1$, $Q_2$ remain off, and the heating unit 24 remains deenergized. That is, when the ambient temperature remains high a reduced detection signal may indicate that the quantity of received light has been decreased, not by dewing, but by another cause, and hence no current is carried to the heating unit 24.

Figure 4:
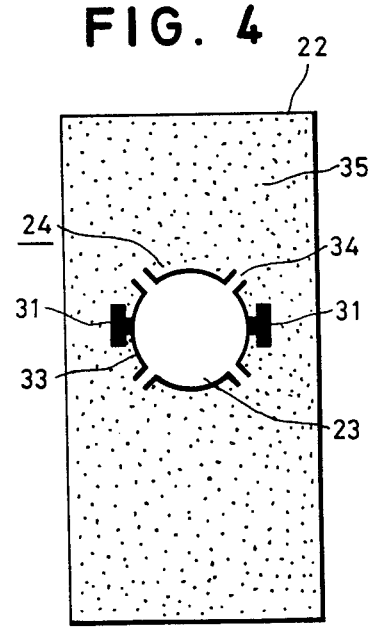
FIG. 4 is a front view showing a light transmitting plate according to another embodiment of the invention.

FIG. 4 shows the light transmitting plate 22 applied to the light receiving part of a transmissive photoelectric switch. As is known well, a transmissive photoelectric switch has a light emitting part separated from, and facing, its light receiving part. A light projected from the light emitting part is received in the light receiving part. A circular beam transmission part 23 is formed on the light transmitting plate 22 on the front of a body of the light receiving part. The circular beam transmission part 23 allows only the beam of light incident on the light receiving part to pass therethrough. The surrounding current passage 33 constituting the heating unit 24 is formed in a circle surrounding the beam transmission part 23. A plurality of gaps 34 are provided in the surrounding current passage 33. The carbon material 35, used as a resistor, is applied over the entire surface of the light of transmitting plate except for the circular current passage 33 and the electrodes 31.

In the aforementioned construction, the small beam transmission part 23 is heated almost instantaneously by energization of the heating unit 24. Dew can be removed in a short time. Further, since the carbon material (black) 35 is applied over the entire surface outside of the circular current passage 33, the carbon material blackens the portion that it covers in order to hide and protect the interior of the photoelectric switch body 21.

As described above, according to the invention, energization of the heating unit 24 is controlled by a drop of ambient temperature combined with a decrease in the quantity of received light as AND conditions. Therefore a dew can be removed almost immediately, and energization of the heating unit 24 can be cut off as soon as the quantity of received light increases to its normal value when the dew is removed. This permits coping swiftly with change in the environment. Further, a cheap and compact built-in device may be provided.

Having described preferred embodiments of the invention with reference to the accompanying drawings, it is to be understood that the invention is not limited to those precise embodiments, and the various changes and modifications may be effected therein by one skilled in the art without departing from the scope or spirit of the invention as defined in the appended claims.

What is claimed is:

1. A photoelectric switch, comprising:
   a light receiving part;
   a light transmitting plate on said light receiving part;
   a beam transmission part in said light transmitting plate;
   a heating unit on said light transmitting plate surrounding said beam transmission part;
   means for producing a first signal when an environmental temperature falls below a first set value;
   means for producing a second signal when a quantity of light received through said beam transmission part falls below a second set value; and
   means responsive to the simultaneous presence of said first signal and said second signal for energizing said heating unit.

2. A photoelectric switch according to claim 1, wherein said heating unit is a generally annular member surrounding said beam transmission part.

3. A photoelectric switch according to claim 2, wherein:
   said annular member includes an electrically resistive material coated on said light transmitting plate, and an electrically conductive surrounding current passage in contact with said electrically resistive material;
   electrodes for feeding electricity to said surrounding current passage;
   at least one gap in said surrounding current passage; and
   said electric current being forced to flow through said electrically resistive material in said gap, whereby heat is produced about said beam transmission part.

4. A photoelectric switch according to claim 1 wherein said heating unit includes:
   a coating of an electrically resistive covering substantially all of said light transmitting plate except for said beam transmitting part;
   a generally annular electrically conductive surrounding current passage surrounding said beam transmitting part in contact with said electrically resistive material;
   electrodes for feeding electricity to said surrounding current passage;
   at least one gap in said surrounding current passage; and
   said electric current being forced to flow through said electrically resistive material in said gap, whereby heat is produced about said beam transmission part.

5. A photoelectric switch according to claim 4, wherein said coating is generally opaque.

6. A photoelectric switch according to claim 5 wherein said coating is black.

7. A heating unit for a beam transmitting part of a light transmitting plate comprising:
   a resistive material coated on said light transmitting plate surrounding said beam transmitting part;
   a conductive surrounding current passage in electrical contact with said resistive material and surrounding a substantial part of said beam transmitting part;
   at least one gap in said surrounding current passage; and
   means for feeding electrical power to said surrounding current passage, whereby said electrical power crosses said at least one gap through said resistive material and heat is generated therein.

8. A control circuit for controlling energization of a heater for heating a vicinity of a beam transmission part, comprising:
   means for producing a first signal in response to an environmental temperature falling below a first set value
   means for producing a second signal in response to a light beam passing through said beam transmission part falling below a second set value; and
   a driver responsive to the simultaneous occurrence of said first and second signal for energizing said heater.

9. A control circuit according to claim 8, wherein:
   said means for producing said second signal includes peak holding part; and
   said peak holding part including means for holding a peak of said first signal on a time constant that is long compared to short-term events in operation of said beam transmitting part.

10. A control circuit according to claim 8, wherein said means for producing said first signal includes a non-linear resistor; and
    said non-linear resistor being of a type whose resistance changes with temperature.

11. A control circuit according to claim 10, wherein said non-linear resistor is a thermistor.

* * * * *